United States Patent [19]

Rinkewich

[11] Patent Number: 4,609,154
[45] Date of Patent: Sep. 2, 1986

[54] WATER IRRIGATION APPARATUS AND PIPE CONSTRUCTION PARTICULARLY USEFUL THEREIN

[76] Inventor: Isaac Rinkewich, 12 Fishman Maimon Street, Tel-Aviv, Israel

[21] Appl. No.: 594,868

[22] Filed: Mar. 29, 1984

[30] Foreign Application Priority Data

Feb. 7, 1984 [IL] Israel ................................. 70892

[51] Int. Cl.[4] ............................................. A01G 25/02
[52] U.S. Cl. ..................................... 239/713; 138/115
[58] Field of Search ............................... 239/712–716, 239/178, 183, 717–721; 138/115

[56] References Cited

U.S. PATENT DOCUMENTS

| | | | |
|---|---|---|---|
| 1,299,884 | 4/1919 | Webber | 138/115 |
| 1,930,285 | 10/1933 | Robinson | 138/115 |
| 2,665,941 | 1/1954 | Idler | 239/716 |
| 3,626,986 | 12/1971 | Rapp et al. | 138/115 |
| 3,903,929 | 9/1975 | Mock | 138/115 |
| 4,096,887 | 6/1978 | Streit | 138/115 |
| 4,269,357 | 5/1981 | Menzel et al. | 138/115 |
| 4,491,274 | 1/1985 | Noble | 239/183 |

Primary Examiner—Joseph F. Peters, Jr.
Assistant Examiner—Scott Malpede
Attorney, Agent, or Firm—Benjamin J. Barish

[57] ABSTRACT

Water irrigation apparatus comprises a water supply pipe and means for moving it over the ground to be irrigated, the water supply pipe including a plurality of coaxial tubes, and a plurality of longitudinally-extending, circumferentially-spaced radial ribs supporting the inner tube within and spaced from the outer tube. Water is inletted into the inner tube, and outletted therefrom along longitudinally-spaced points.

19 Claims, 13 Drawing Figures

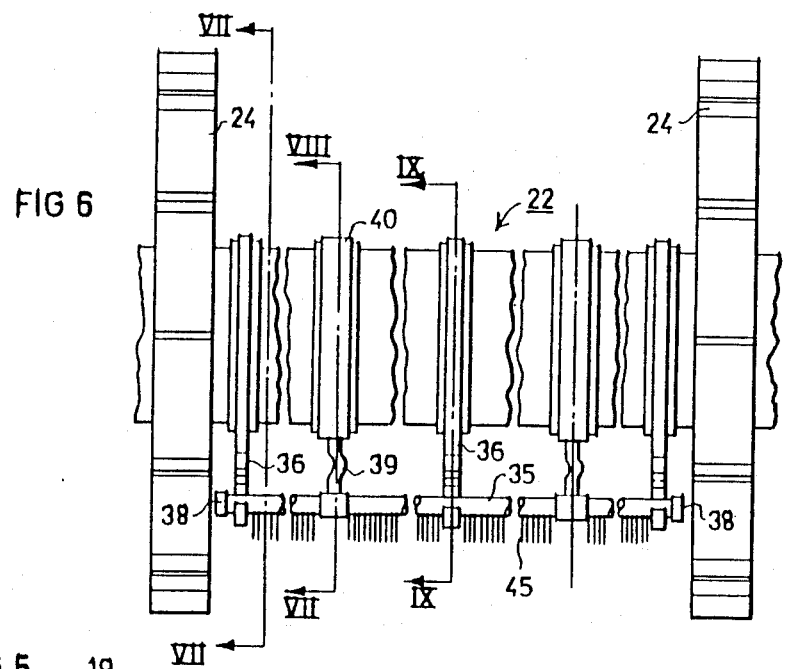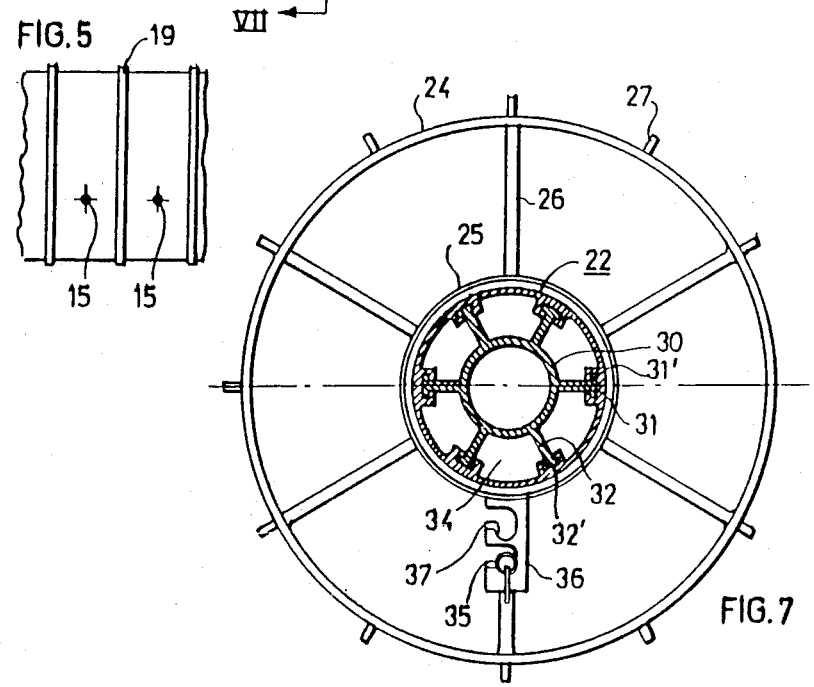

WATER IRRIGATION APPARATUS AND PIPE CONSTRUCTION PARTICULARLY USEFUL THEREIN

BACKGROUND OF THE INVENTION

The present invention relates to water irrigation apparatus, and also to a pipe construction particularly useful in such apparatus. The invention is especially useful in mobile irrigation systems of the pivot, linear or side-roll type, and is therefore described below with respect to such application.

Pivot, linear and side-roll water irrigation systems include a water supply pipe which is supported between large spans thereof as the pipe is moved over the ground to be irrigated. The water supply pipe may be supported by wheels or towers, and the spans between the wheels or towers are typically from 40 to 120 feet. These spans usually include additional external supporting structures, such as bridges, beams, girders, channels, trusses or wires, but such reinforcement structures add very substantially to the overall cost of the apparatus. On the other hand, increasing the length of the spans can decrease the overall cost, but the span length is very substantially limited by the weight of the water distribution pipe plus the weight of the water carried by it.

For example, with respect to side-roll systems having a pipe supported between two mobile wheels, the present practice is to move the water supply pipe to each location after having been drained of water, in order to reduce its weight; when at the desired location to fill it and to effect the water distribution; and after the water supply pipe has been emptied, to move it to the next location to tbe irrigated. This is because of the weight of the pipe when filled with water. Thus the weight of the water in the water supply pipe is many times the weight of the pipe itself, being about six times the weight of a three-inch aluminum pipe and about ten times the weight of a six-inch aluminum pipe. A forty-foot span of aluminum pipe filled with water weights about 144 pounds for a three-inch pipe, 247 pounds for a four-inch pipe, 378 pounds for a five-inch pipe, and 540 pounds for a six-inch pipe. If such a pipe when filled with water is moved across the field, the pipe will undergo a substantial deflection which, even though not beyond the yielding point, nevertheless can cause early failure of the pipe. This is because rotating the pipe while so deflected by the weight of the pipe will produce frequent deflection reversals, producing torsional stresses as well as deflection stresses, which will accelerate the chance of rupture of the pipe.

SUMMARY OF THE INVENTION

An object of the present invention is to provide water irrigation apparatus having advantages in the foregoing respects. Another object of the invention is to provide a water supply pipe construction particularly useful in such apparatus, but useful in other applications, as will be described below.

According to one broad aspect of the present invention, there is provided water irrigation apparatus including a water supply pipe having means for supporting same between large spans thereof and for moving the pipe over the ground to be irrigated, characterized in that the water supply pipe includes a plurality of coaxial tubes, including at least an inner tube and an outer tube, and a plurality of longitudinally-extending circumferentially-spaced radial ribs supporting said inner tube within and spaced from the outer tube; means for inletting water into the inner tube; and means for outletting water therefrom along longitudinally-spaced points of the water supply pipe.

Such apparatus, by exploiting the fact that the moment of inertia and the section modulus of a pipe increases with its diameter, increases appreciably the structural strength of the water supply pipe while adding only a little to its total weight, even when filled with water. For example, the weight of a five-inch pipe is about twice that of a three-inch pipe, while the moment of inertia of a five-inch pipe is about five times that of a three-inch pipe. Therefore, the water supply pipe of the present invention, even when its inner tube is filled with water, will undergo substantially less torsional stress and deflection stress than in the conventional construction using water supply pipes of the same capacity, such that the spans between the wheels or towers can be substantially increased, thereby reducing the overall cost of the system. In addition, in side-roll systems, the deflection of the water supply pipe by the weight of the pipe and the water therein is substantially reduced so that the distribution of the water from the pipe can occur concurrently with the movement of the pipe over the ground to be irrigated, thereby reducing the time of operation and increasing the efficiency of the irrigation system.

The invention may be embodied in many types of mobile irrigation systems, including the pivot, linear, or side-roll systems. In one embodiment described below, the radial ribs define a plurality of compartments between the inner and outer tubes, at least one of the compartments serving to distribute the water from the inner tube to outlets along longitudinally-spaced point of the water supply pipe; the latter compartment includes end plugs along longitudinally-spaced points thereof to define a plurality of water-distribution chambers longitudinally of the water supply pipe and communicating with the inner tube. In a second described embodiment, the apparatus further includes a water distribution pipe supported by and depending below the water supply pipe, the water distribution pipe including water couplints at longitudinally-spaced points thereof for inletting water from the water supply pipe, and outlets at longitudinally-spaced points thereof for outletting the water over the ground to be irrigated; in a third described embodiment, the apparatus includes a water distribution pipe secured to the outer tube, the water distribution pipe including water couplings at longitudinally-spaced points thereof for inletting water from the water supply pipe, and outlets at longitudinally-spaced points for outletting the water over the ground to be irrigated.

According to another aspect of the invention, there is provided a pipe particularly useful in water irrigation apparatus of the foregoing type, but also useful in other applications, the pipe including coaxial inner and outer tubes and radial ribs formed as two separate units by extrusion, and include complementary tongues and grooves for interlocking the units together with the inner and outer tube in coaxial relationship.

Further features and advantages of the invention will be apparent from the description below.

BRIEF DESCRIPTION OF THE DRAWINGS

The invention is herein described, by way of example only, with reference to the accompanying drawings, wherein:

FIG. 5 is enlarged side elevational view illustrating a fragment of the apparatus of FIG. 1;

FIG. 6 is a side elevational view illustrating a second form of water irrigation apparatus constructed in accordance with the present invention;

FIGS. 7, 8 and 9 are transverse sectional views along lines VII—VII, VIII—VIII and IX—IX, respectively of FIG. 6;

DESCRIPTION OF PREFERRED EMBODIMENTS

Figure 1:
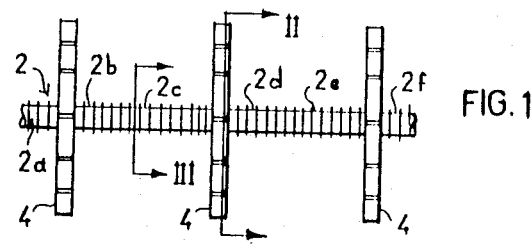
FIG. 1 illustrates side-roll water irrigation apparatus constructed in accordance with the present invention.
Figure 2:
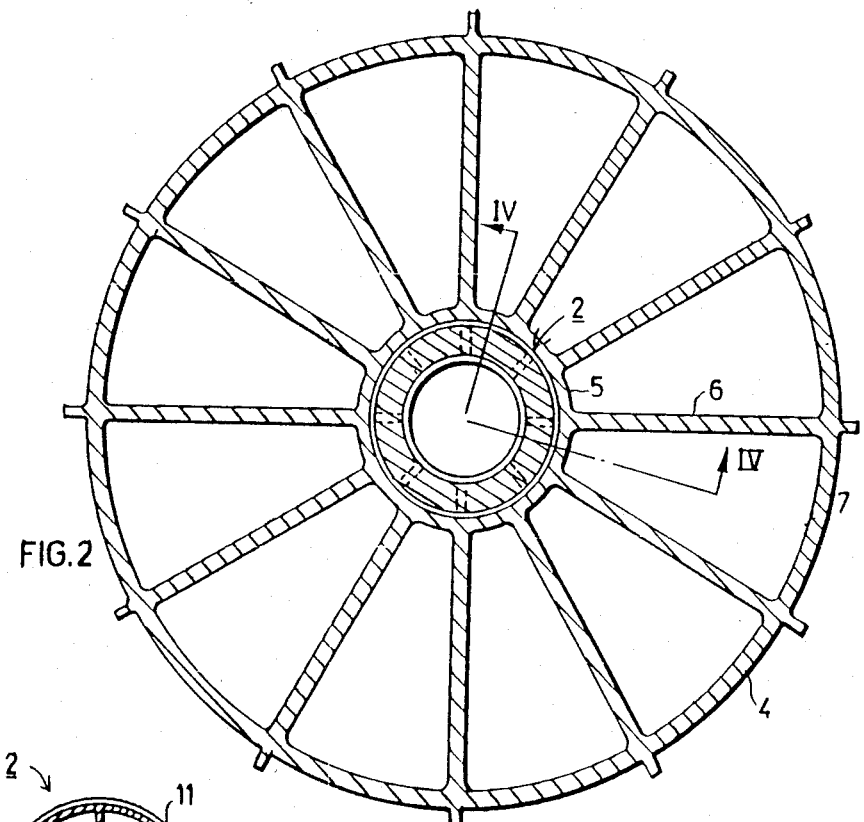
FIGS. 2 and 3 are enlarged sectional views along lines II—II and III—III of said FIG. 1, respectively.

The water irrigation apparatus illustrated in FIGS. 1-5 is of the side-roll type, including a water supply pipe, generally designated 2, supported along spans thereof by a plurality of wheels 4 of a substantially larger diameter than that of the water supply pipe 2. The water supply pipe is supported within the hubs 5 of the wheels 4, which hubs are connected by spokes 6 to the outer wheel circumference, the outer faces of which include traction cleats 7.

Figure 3:
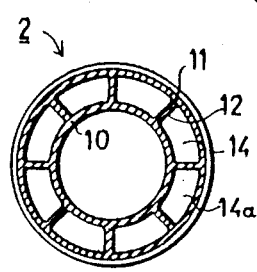

As shown particularly in FIG. 3, the water supply pipe 2 includes an inner tube 10, an outer tube 11, and plurality of longitudinally-extending, circumferentially spaced, radial ribs 12, supporting inner tube 10 within, and spaced from, the outer tube 11. The radial ribs 12 define, between the inner tube 10 and the outer tube 11, a plurality of longitudinally-extending compartments 14. In the embodiment of the invention illustrated in FIGS. 1-5, one of these compartments, indicated at 14a, serves to distribute the water from the inner tube 10 to outlets spaced along the outer tube 11. The latter outlets are small openings 15 formed through the wall of the outer tube 11 defining dripper nozzles which produce slow flows or trickles of water therethrough.

Figure 4:
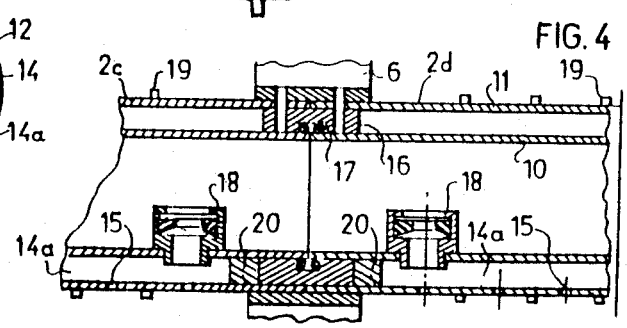
FIG. 4 is a sectional view along lines IV—IV of FIG. 2.

The water supply pipe 2 can be produced in sections, as indicated by sections 2a-2f in FIG. 1, sections 2c and 2d being shown in FIG. 4. An end plug 16 is inserted in the space between the inner tube 10 and the outer tube 11 at the end of each section, and the sections are mounted together by means of seal glands 17 received in the ends of the adjacent sections.

Before inserting the end plugs 16 and seal glands 17, a water regulator device 18 is applied to the end of each section to establish communication between the interior of the inner tube 10 and one of the compartments 14 between the inner and outer tubes 10, and 11, namely the water distribution compartment 14a. Water regulators 18 are flow regulators to regulate the flow of the water from the interior of tube 10 to compartment 14a so that there will be a relatively constant flow from the latter compartment to the dripper nozzles 15. Alternatively, water regulators 18 may be pressure regulators which provide a constant water pressure within the water distribution compartments 14a. The latter compartments are sealed at both ends by seals 20.

The outer face of the outer tube 11 is provided with a plurality of annular rings 19 disposed circumferentially around the outer tube and spaced longitudinally thereof. Rings 19 block the water outletted from the dripper nozzles 15 from flowing along the outer face of the outer tube 11, and thereby cause the water to fall by gravity along the longitudinally-spaced points of the outer tube 11.

The water irrigation apparatus illustrated in FIGS. 1-5 operates as follows:

A supply of pressurized water is connected to the inner tube 2 so that its interior is always filled with pressurized water. This water is fed to all the pipe sections 2a-2f, and in each section it is fed via the regulators 18 into compartment 14a of the many compartments 14 defined by ribs 12 in the annular space between the inner tube 10 and the outer tube 11. From compartment 14a the water flows via dripper nozzles 15 to the outer face of the outer tube 11 where the annular rings 19 block the water flow and cause it to fall by gravity along longitudinally spaced points of the water supply pipe.

Thus, as the apparatus rolls along the ground on its wheels 4, the water supply pipe 2 uniformly distributes the water from the interior of the inner tube 10 to the outer face of the outer tube 11, from where the water drops by gravity to the ground to irrigate it.

One example, the inner tube 10 may have a diameter of 3 inches, and the outer tube 11 may have a diameter of five inches. Since only compartment 14a in the space between the inner and outer tubes is filled with water, the total weight of the water supply pipe, including the water contained therein, will be very substantially less than the total weight of a 5-inch pipe; on the other hand, the moment of inertia and the section modulus of the water supply pipe will be that of a 5-inch pipe, namely about five times that of a 3-inch pipe. It will therefore be seen that the water supply pipe 2 in the system illustrated in FIGS. 1-5 will be deflected substantially less than in a conventional system having the same water capacity, thereby enabling the water distribution to be effected while the apparatus is moving over the ground, and/or enabling the apparatus to be supported in longer spans between the supporting wheels 4, or supporting towers when a tower-type system is used.

The inner tube 10 and outer tube 11, together with the radial ribs 12, may all be manufactured integrally by extrusion, and cut into sections, as described above. Alternatively, the coaxial inner and outer tubes and radial ribs could be formed as two separate units by extrusion, and could include complementary tongues and grooves for interlocking the two units together in coaxial relationship. The embodiment of the invention illustrated in the FIGS. 6-10 shows such an arrangement for manufacturing the coaxial tubes and interconnecting radial ribs. The latter embodiment also illustrates a further variation, wherein the water distribution is made from the inner tube by means of a water distribution pipe supported by and depending below the water supply pipe in an arrangement similar to that described in my copending patent application Ser. No. 544,131.

Thus, the apparatus illustrated in FIGS. 6-10 includes a water supply pipe, designated 22, supported between a plurality of wheels 24, having hubs 25, receiving the water supply pipe 22. Wheels 22 also include spokes 26 and traction cleats 28.

The water supply pipe 22, supported between wheels 24, is also of a coaxial tubular construction, including inner tube 30, an outer tube 31, and a plurality of longitudinally-extending circumferentially-spaced radial ribs 32 dividing the space between tubes 30 and 31 into a plurality of compartments 34. In this case, however, none of the compartments 34 receives water from the inner tube 30, but rather all the compartments are air-filled and serve merely to increase the structural strength of the water supply tube 22 against deflection under the weight of the water supply tube and the water contained therein, as discussed above.

The coaxial inner and outer tubes 30, 31, and their connecting ribs 32, may also be produced integrally by extrusion as discussed above: but the embodiment of FIGS. 6-10 illustrates the variation wherein they are formed as two separate extruded units. One unit includes The inner tube 30 and the radial ribs 32, the outer ends of the latter terminating in tongues 32'; and the other unit includes the outer tube 31 and elongated recesses 31' which receive tongues 32' in order to interlock the two units together to form the coaxial-tube assembly. It will be appreciated that another alternative would be to form ribs 32 integrally with the outer tube 31, with the inner ends of the ribs terminating in tongues received within elongated recesses formed in the outer face of the inner tube 30.

In the embodiment of FIGS. 6-10, the water is distributed via a water distribution pipe 35 supported by a plurality of brackets 36 rotatably mounted to the water supply pipe 22, so that the water distribution pipe 35 remains suspended below the water supply pipe 22 as the latter is rolled over the ground on the wheels 24. Brackets 36 include a plurality of notches 37 for supporting the water distribution pipe 35 at different distances above the ground.

As shown particularly in FIG. 6, a separate water distribution pipe 35 is provided for each span between two adjacent wheels 24. The ends of each distribution pipe 35 are closed by end plugs 38, and water is supplied to the pipe by flexible tubes 39 connected to revolving glands 40, which glands are in turn connected to the interior of the inner pipe 30 to receive pressurized water therefrom.

Figure 8:
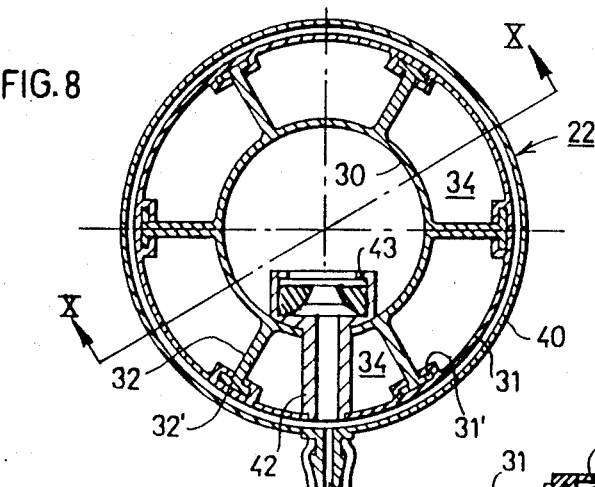
Figure 10:
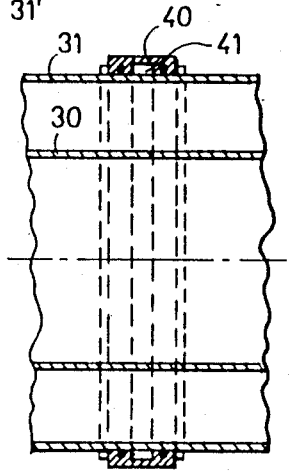
FIG. 10 is a sectional view along lines X—X of FIG. 8.
Figure 9:
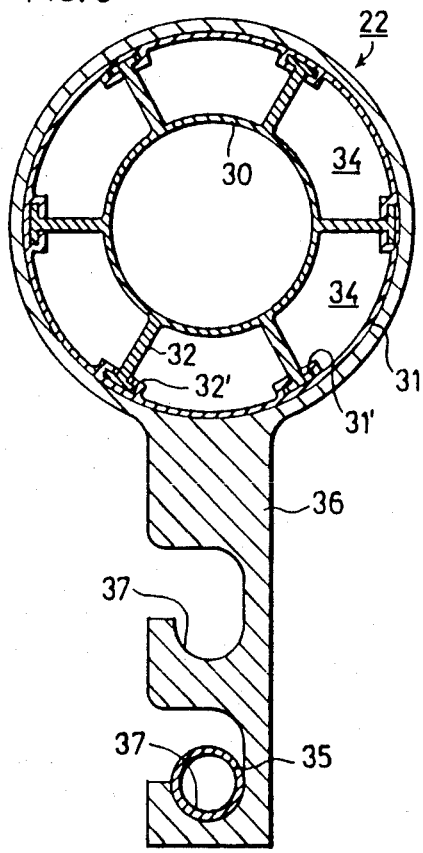

The connection of the water distribution pipes 35 to the interior of the inner tube 30 is best seen in FIGS. 8 and 10 where it will be seen that gland 40 is rotatably received around the outer face of the outer tube 31 and defines a sealed annular chamber 41 between the gland and tube 31. Annular chamber 41 is connected to the interior of tube 30 via a connector 42 passing through one of the compartments 34 between tubes 30 and 31. The inner end of connector 42 is provided with a water regulator 43, preferably of the flow type, regulating the flow of the water from the interior of the tube 30 via connector 42 to the sealed annular chamber 41, and from there via flexible tube 39 to the interior of the water distribution tube 35.

The water distribution tube 35 includes a plurality of outlets, preferably in the form of dripper nozzles 45, spaced longitudinally along the length of the distribution pipe, to uniformly distribute the water over the ground as the apparatus rolls along the ground on wheels 24.

Figure 11:
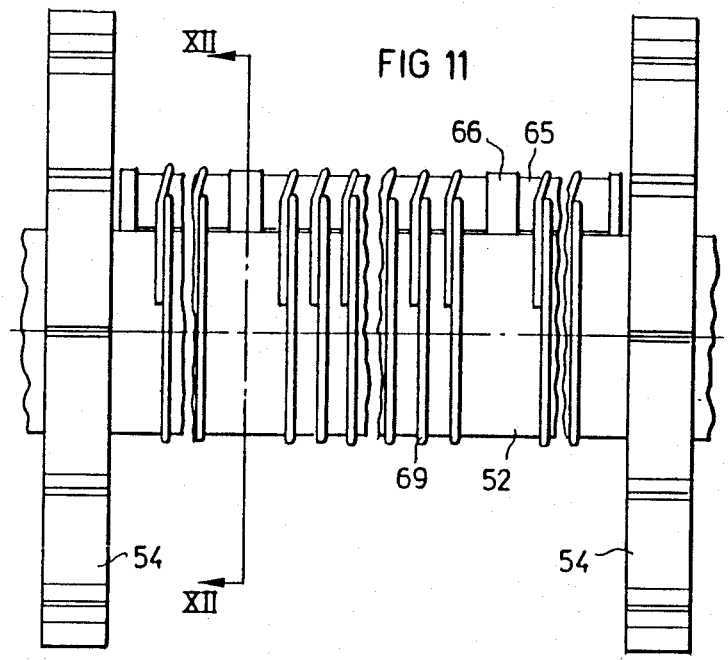
FIG. 11 is a side elevational view illustrating a third form of water irrigation apparatus constructed in accordance with the invention.
Figure 12:
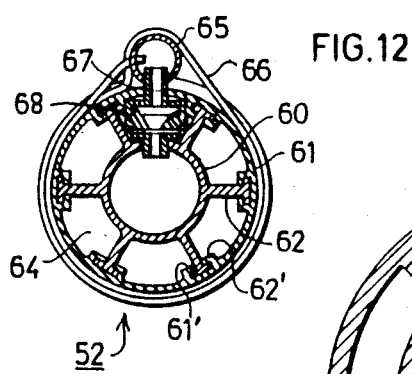
FIG. 12 is a sectional view along lines XII—XII of FIG. 11.

FIGS. 11 and 12 illustrate a further embodiment of the invention, including a water supply pipe 52 supported between wheels 54. The water supply pipe 52 also includes an inner tube 60 for receiving s supply of pressurized water, an outer tube 61 coaxial with the inner tube, and a plurality of radial ribs 62 supporting the inner tube within and spaced from the outer tube. The water supply pipe 52 is made of two extruded units, as in the embodiment of FIGS. 6-10, one extruded unit including the inner tube 60 and the radial ribs 62 terminating in tongues 62', which tongues mate with recesses 61' formed in the inner face of the outer tube 61, constituting the second extruded unit.

In the embodiment of FIGS. 11 and 12, the water is distributed from the inner tube 60 via a water distribution pipe 65 secured by a clamp 66, to the outer face of the outer tube 61. The water distribution pipe 65 is supplied with water from pipe 60 via a connector 67 passing through one of the compartments 64 defined by the radial ribs 62 between the inner and outer tubes 61, which connector 67 includes a regulator 68 for regulating the flow of water to the water distribution pipe 65.

Figure 13:
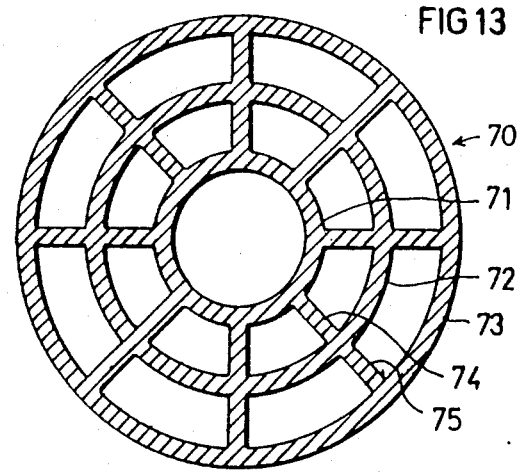
FIG. 13 illustrates another supply pipe which may be used.

The water is outletted from the water distribution pipe 65 via a plurality of dripper nozzles each including an elongated tube 69 wrapped around the outer face of the outer tube 61 of the water supply pipe 62, and also around the outer face of the water distribution pipe 65, as shown particularly in FIG. 11. By this arrangement, the outlet tubes 69 also serve the function of the annular rings 18 in the FIGS. 1-5 embodiment; i.e., they block the water from flowing along the outer face of the outer tube 61, and cause it to fall by gravity along the longitudinally-spaced points of the water supply pipe 52 during the rotation of the apparatus over the ground, obviously, the water supply pipe could include more than two coaxial tubes. This is shown in FIG. 13, wherein the illustrated water supply pipe therein designated 70, includes an inner tube 71 for the pressurized water, an intermidiate tube 72, and an outer tube 73, all connected together by radial ribs 74 and 75. Such a construction enables the -outer diameter of the water supply pipe to be substantially increased.

While the invention has been described with respect to a side-roll type of water irrigation system, it will be appreciated that the invention could advantageously be used also in other mobile types of irrigation systems, such as the pivot type or linear type. Also, the coaxial tube structure, particularly the construction permitting the coaxial tubes to be produced by two extruded units having interlocking tongues and recesses, could be used in other water or liquid distribution systems, or in many other applications, e.g., for electrical conduits, light posts, antenna posts, boat masts, and the like.

Many other variations, modifications and applications of the invention will be apparent.

What is claimed is:

1. Water irrigation apparatus including a water supply pipe having means for supporting same between large spans thereof and for moving the pipe over the ground to be irrigated, characterized in that said water supply pipe iucludes a plurality of coaxial tubes extending the length of said supply tube, including at least an inner tube and an outer tube, and a plurality of longitudinally-extending circumferentially-spaced radial ribs supporting said inner tube within and spaced from said outer tube; means for inletting water into said inner tube; and means for outletting water therefrom.

2. Apparatus according to claim 1, wherein said radial ribs define a plurality of compartments between said inner and outer tubes, at least one of said compartments serving to distribute the water from the inner tube to outlets along longitudinally-spaced point of the water supply pipe.

3. Apparatus according to claim 2, wherein said one compartment includes end plugs along longitudinally-spaced points whereof to define a plurality of water-distribution chambers longitudinally of said water supply pipe and communicating with said inner tube.

4. Apparatus according to claim 3, wherein said plurality of water distribution chambers communicate with said inner tube via water-regulating devices.

5. Apparatus according to claim 3,
wherein each of said water-distribution chambers includes a plurality of dripper nozzles for outletting the water along longitudinally-spaced points of the water supply pipe.

6. Apparatus according to claim 1,
wherein said outer tube includes a plurality of annular rings spaced longitudinally thereof for blocking the water from flowing along the face of the outer tube and causing the water to fall by gravity along the longitudinally-spaced points of the water supply pipe.

7. Apparatus according to claim 1, further including a water distribution pipe supported by and depending below said water supply pipe, said water distribution pipe including water couplings at longitudinally-spaced points thereof for inletting water from said water supply pipe, and outlets at longitudinally-spaced points thereof for outletting the water over the ground to be irrigated.

8. Apparatus according to claim 7, wherein there are a plurality of water distribution pipes each supported by and depending below a different section of said water supply pipe.

9. Apparatus according claim 7,
wherein said water distribution pipes are supported from their respective sections of the water supply pipes by adjustable hangers.

10. Apparatus according to claim 7,
wherein said outlets are dripper nozzles.

11. Apparatus according to claim 7,
wherein the water couplings include water regulating devices.

12. Apparatus according to claim 1, further including a water distribution pipe secured to said outer tube, said water distribution pipe including water couplings at longitudinally-spaced points thereof for inletting water from said water supply pipe, and outlets at longitudinally-spaced points for outletting the water over the ground to be irrigated.

13. Apparatus according to claim 12, wherein said outlets are dripper nozzles.

14. Apparatus according to claim 13, wherein said dripper nozzles include elongated tubes wrapped around the outer face of said outer tube for blocking the water from flowing along the outer face of the outer tube, and causing same to fall by gravity along longitudinally-spaced points of the water supply pipe.

15. Apparatus according to claim 12,
wherein said water couplings include water regulating devices.

16. Apparatus according to claim 1,
wherein said water supply pipe is supported by wheels spaced along the length thereof.

17. Apparatus according to claim 1,
wherein said water supply pipe includes at least one additional tube between, and coaxial with, said inner and outer tubes.

18. Apparatus according to claim 1,
wherein said coaxial tubes and radial ribs are formed integrally by extrusion.

19. Apparatus according to claim 1,
wherein said coaxial inner and outer tubes and radial ribs are formed as two separate units by extrusion, and include complementary tongues and grooves for interlocking the units together with the inner and outer tube in coaxial relationship.

* * * * *